No Printed Specification
1907X
S. Parker,
Splitting Leather,
Patented Apr. 5, 1813.
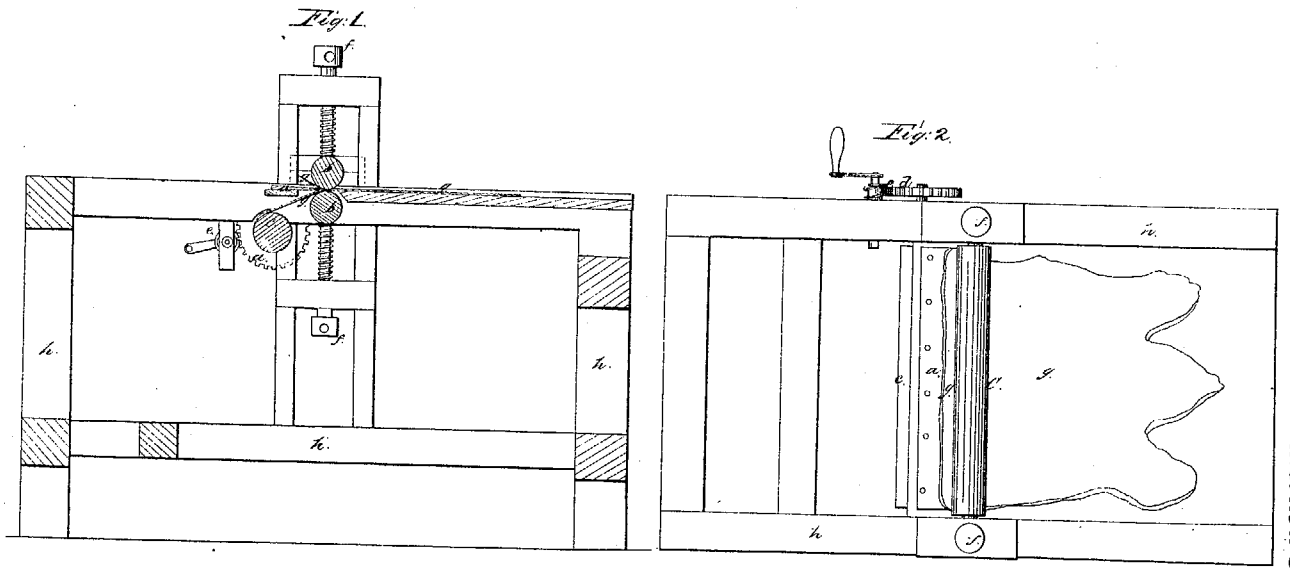
N. PETERS, PHOTO-LITHOGRAPHER, WASHINGTON, D. C.

Samuel Parker. 1907X
Letter Patent

The schedule referred to in these Letters Patent and making part of the same containing a description in the words of the said Samuel Parker him-self of his improvement in his machine for shaving and splitting leather pa-tented the 9th July 1808 and in another patented the 26th April 1809.

---

This improvement consists in principles to split a shaving an even thick-; from the skin in its natural thickness, by placing a knife stationary, near the knife is placed a movable gage which may turn on its axis or pivots at the ends or may be other ways used regulated by screws springs and keys or ei-ther of them to govern the thickness of the shaving. The skin is confined smooth to the gage and knife by a movable spring plate or gage turning on its axis or pivots at the ends and regulated by screws and springs or may be other ways used. The skin is drawn by a roller in or to which it is confined by a movable holdfast. The motion is communicated to the roller by a perpetual screw turning a wheel on the roller by a winch and may be exchanged for multiplied wheels to gain a purchas or for any other power of motion. The skin when in the operation of spliting may be extended by hand labour or by machinery mentioned in the patents referd to. The leather when loos before the knife is drawn smooth by placing sutable formed pieces under the skin let-ing them wind on or round the roller, the above operation ma, also be per-formed by placing the gage stationary and the knife movable to govern the thickness of the shaving - or they may be both movable or both stationary or both may be confined together, or a roller may be applied for a gage and in either way perform the operation by confining the skin smooth to the gage and knife by a spring plate which may be made in any form that will give to the skin as the thickness varies. The shaving passes an even thickness be-tween the gage and knife the other part between the spring plate and knife. By removing and changing the gage and spring plate and placing the gage in the place of the spring plate and the spring in the place of the gage the principle is reversed and the shaving passes between the spring plate and Drawing [illegible].

the knife uneven if taken from the natural thickness of the skin while the other part passes even between the gage and knife letting part of the leather or skin pass without spliting when chosen, by thus simply removing and changing the gage and spring plate made in a form to suit both principles two most important operations are performed in the same machine and may be used in both or either way in the same or in seperate machines — .

The edge of the knife may be placed to meet the skin in a horizontal, angular, or perpendicular direction and the skin pass by the side, over or under the knife, and perform the same operation by placing the gage spring plate and roller to conform to the position of the knife, or the skin may be drawn in any other way.

Witnesses
William Thornton
Geo. Lyon

Samuel Parker

Drawing made [illegible]

Exd
[illegible]